United States Patent
Wong et al.

(10) Patent No.: US 8,501,254 B2
(45) Date of Patent: Aug. 6, 2013

(54) SYSTEM, A METHOD AND A CAPSULE FOR PREPARING A PRE-DETERMINED QUANTITY OF BEVERAGE

(75) Inventors: Kon Euan Gerard Wong, Burwood East (AU); Guido Brandt, Bentleigh East (AU); Hendrik Cornelis Koeling, Amersfoort (NL); Ralf Kamerbeek, De Meern (NL); Arend Cornelis Jacobus Biesheuvel, Werkendam (NL)

(73) Assignee: Koninklijke Douwe Egberts B.V. (NL)

( * ) Notice: Subject to any disclaimer, the term of this patent is extended or adjusted under 35 U.S.C. 154(b) by 0 days.

(21) Appl. No.: 13/323,430

(22) Filed: Dec. 12, 2011

(65) Prior Publication Data
US 2012/0258219 A1    Oct. 11, 2012

Related U.S. Application Data

(63) Continuation of application No. PCT/NL2009/050816, filed on Dec. 30, 2009.

(30) Foreign Application Priority Data

Jun. 17, 2009  (EP) .................................... 09162934
Jun. 17, 2009  (EP) .................................... 09162982
Jun. 17, 2009  (EP) .................................... 09162995
Jun. 17, 2009  (EP) .................................... 09162998

(51) Int. Cl.
*B65B 29/02*    (2006.01)

(52) U.S. Cl.
USPC ............................. 426/77; 426/431; 99/295

(58) Field of Classification Search
USPC ................. 426/77, 78, 79, 80, 81, 82, 83, 84, 426/431; 99/295
See application file for complete search history.

(56) References Cited

U.S. PATENT DOCUMENTS

| | | |
|---|---|---|
| 3,615,708 A | 10/1971 | Abile-gal |
| 4,321,139 A | 3/1982 | Auclair |
| 4,417,504 A | 11/1983 | Yamamoto |
| 4,859,337 A | 8/1989 | Woltermann |
| 5,325,765 A | 7/1994 | Sylvan et al. |
| 5,840,189 A | 11/1998 | Sylvan et al. |

(Continued)

FOREIGN PATENT DOCUMENTS

| | | |
|---|---|---|
| WO | WO 03/059778 A2 | 7/2003 |
| WO | WO 2007/114685 A1 | 10/2007 |
| WO | WO 2008/132571 A1 | 11/2008 |

OTHER PUBLICATIONS

International Search Report for PCT Patent Application No. PCT/NL2009/050816, dated Mar. 1, 2010, 2 pages.

*Primary Examiner* — Rena Dye
*Assistant Examiner* — Chaim Smith
(74) *Attorney, Agent, or Firm* — Foley & Lardner LLP

(57) ABSTRACT

A system and method for preparing a predetermined quantity of beverage suitable for consumption using an extractable product is disclosed. The system comprises at least one disposable capsule; an apparatus comprising a fluid dispensing device for supplying an amount of fluid, such as water, to the at least one disposable capsule, a receptacle for accommodating the at least one disposable capsule, and an outlet arrangement for supplying the beverage to a container, such as a cup. The at least one disposable capsule comprises a chamber for enclosing an inner space comprising the extractable product. The capsule further comprises a displaceable body conceived to interact with an entrance area and an exit area of the capsule for discontinuing the entrance area and the exit area thereby enabling the chamber to pass fluidum there through.

22 Claims, 5 Drawing Sheets

U.S. PATENT DOCUMENTS

| | | | |
|---|---|---|---|
| D408,679 S | 4/1999 | Potts et al. |
| 6,079,315 A | 6/2000 | Beaulieu et al. |
| 6,082,247 A | 7/2000 | Beaulicu |
| 6,142,063 A | 11/2000 | Beaulieu et al. |
| 6,182,554 B1 | 2/2001 | Beaulieu et al. |
| D452,433 S | 12/2001 | Lazaris |
| D452,434 S | 12/2001 | Sweeney |
| 6,440,256 B1 | 8/2002 | Gordon et al. |
| D462,865 S | 9/2002 | Honan et al. |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,644,173 B2 | 11/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,708,600 B2 | 3/2004 | Winkler et al. |
| D489,215 S | 5/2004 | Honan et al. |
| D502,362 S | 3/2005 | Lazaris et al. |
| D513,572 S | 1/2006 | Schaffeld et al. |
| 7,165,488 B2 | 1/2007 | Bragg et al. |
| D544,299 S | 6/2007 | Schaffeld et al. |
| D554,299 S | 10/2007 | Ragonetti et al. |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter et al. |
| 7,513,192 B2 | 4/2009 | Sullivan et al. |
| 7,523,695 B2 | 4/2009 | Streeter et al. |
| 7,543,527 B2 | 6/2009 | Schmed |
| 7,552,672 B2 | 6/2009 | Schmed |
| 7,640,845 B2 | 1/2010 | Woodnorth et al. |
| 7,856,920 B2 | 12/2010 | Schmed et al. |
| 2004/0045443 A1 | 3/2004 | Lazaris et al. |
| 2005/0051478 A1 | 3/2005 | Karanikos et al. |
| 2005/0205601 A1 | 9/2005 | Taylor |
| 2005/0287251 A1 | 12/2005 | Lazaris et al. |
| 2006/0174773 A1 | 8/2006 | Taylor |
| 2006/0292012 A1 | 12/2006 | Brudevold et al. |
| 2008/0095904 A1 | 4/2008 | Sullivan et al. |
| 2008/0115674 A1 | 5/2008 | Huang et al. |
| 2008/0134902 A1 | 6/2008 | Zimmerman et al. |
| 2010/0024658 A1 | 2/2010 | Jacobs et al. |
| 2010/0303964 A1 | 12/2010 | Beaulieu et al. |

PRIOR ART

PRIOR ART

SYSTEM, A METHOD AND A CAPSULE FOR PREPARING A PRE-DETERMINED QUANTITY OF BEVERAGE

CROSS-REFERENCE TO RELATED APPLICATIONS

The present application is a continuation of International Patent Application No. PCT/NL2009/050816 filed on Dec. 30, 2009 (which is hereby incorporated herein by reference); which claimed priority to European Application Nos. 09162995.6, 09162934.5, 09162998.0, and 09162982.4, all filed on Jun. 17, 2009 (all of which are hereby incorporated herein by reference).

FIELD OF THE INVENTION

The invention relates to a system for preparing a predetermined quantity of beverage suitable for consumption using an extractable product, comprising: at least one disposable capsule; an apparatus comprising a fluid dispensing device for supplying an amount of fluid, such as water, to the at least one disposable capsule, a receptacle for accommodating the at least one disposable capsule, and an outlet arrangement for supplying the beverage to a container, such as a cup, wherein the at least one disposable capsule comprises a chamber for enclosing an inner space comprising the extractable product, wherein the chamber comprises: an entrance area enabling passage of the fluid towards the inner space for interacting with the extractable product for preparing the beverage; an exit area for conducting at least a portion of the beverage away from the capsule; wherein the system is further arranged for: bringing the dispensing device in fluid communication with the entrance area for supplying the fluid; enabling the exit area to be positioned in a fluid communication with the outlet arrangement.

The invention further relates to a capsule of a system as is set forth in the foregoing. In particular, according to an aspect of the invention a capsule relates to a substantially hermetically closed capsule which comprises a chamber for enclosing an inner space comprising the extractable product, wherein the chamber comprises: an entrance area enabling passage of the fluid towards the inner space for interacting with the extractable product for preparing the beverage; an exit area for conducting at least a portion of the beverage away from the capsule.

The invention is further relates to use of the capsule in the system as is set forth in the foregoing.

The invention still further relates to a method of preparing a predetermined quantity of beverage suitable for consumption using extractable product in a system, comprising: at least one disposable capsule; an apparatus comprising a fluid dispensing device for supplying an amount of fluid, such as water, to the at least one disposable capsule, a receptacle for accommodating the at least one disposable capsule, and an outlet arrangement for supplying the beverage to a container, such as a cup, wherein the at least one disposable capsule is provided with a chamber for enclosing an inner space comprising the extractable product, wherein the chamber is provided with: an entrance area enabling passage of the fluid towards the inner space for interacting with the extractable product for preparing the beverage; an exit area for conducting at least a portion of the beverage away from the capsule; wherein the system is further arranged for: bringing the dispensing device in fluid communication with the entrance area for supplying the fluid; enabling the exit area to be positioned in a fluid communication with the outlet arrangement.

The invention still further relates to a method of manufacturing a disposable capsule for preparing a predetermined quantity of beverage suitable for consumption using extractable product, the method comprising forming the disposable capsule with a chamber for enclosing an inner space comprising the extractable product, wherein the chamber is provided with: an entrance area enabling passage of a fluid towards the inner space for interacting with the extractable product for preparing the beverage; an exit area for conducting at least a portion of the beverage away from the capsule.

BACKGROUND

In the art hermetically sealed capsules comprising, for example, ground coffee, for placement in a coffee dispensing apparatus, are known per se. During coffee preparation the entrance area of such sealed capsule is pierced, so that entrance openings are provided for supplying fluid under pressure to the ground coffee in the inner space of the capsule. This in turn causes the pressure in the inner space of the capsule to rise, such that an exit area of the capsule is pressed against lid piercing means that are present in the apparatus. When sufficient pressure is applied, the exit area will tear against the lid piercing means creating exit openings through which the coffee drink can drain from the capsule through an outlet present in the apparatus. In use, the outlet is in fluid communication with the exit area of the receptacle so that coffee drink may flow through the outlet. It will be appreciated that the known capsules comprise a single chamber arrangement, whose walls form exterior of the capsule.

It has been found that in a system as explained above, preferential paths of fluid may flow through the extractable product within the capsule, e.g. from the at least one entrance opening to the at least one exit opening, which may lead to undesired strength of the prepared beverage and/or variations in strength of the prepared beverage, from one capsule to another. Moreover, since the exit openings are formed by fluid pressure, the number, position and/or size of the exit openings are formed by chance.

SUMMARY

It is therefore one of the objects of the invention to provide for an alternative system, capsule and method.

To this end, in the system according to the invention the capsule further comprises a displaceable body conceived to interact with the entrance area and the exit area for discontinuing the entrance area and the exit area thereby enabling the chamber to pass fluidum there through. It will be appreciated that the term 'body' may be construed as a suitable actuator comprising one, two or more parts conceived to suitably interact in use. It will be further appreciated that the capsule according to the invention is hermetically sealed. This feature should be interpreted as an enclosure enabling the extractable or soluble product to remain substantially intact, whereby the enclosure is fluid and/or air tight. This feature may allow preservation of flavour or extractability during a relative long period before use.

This technical measure is based on the insight that by equipping the capsule with a displaceable body, suitable creation of pre-determined one or more exit openings is possible, wherein timing, spatial distribution along a surface of the capsule and dimension of the openings may be optimized. It will be appreciated that the displaceable body is preferably arranged at least partially inside the chamber, wherein the product is accommodated.

It will be appreciated that the term 'chamber' should be understood as a material barrier preventing penetration of undesired molecules present or possibly present in the ambient environment into the inner space of the capsule. Preferably, the material barrier is formed for preventing gases, damps and vapours from penetrating into the inner space. As a result, suitable selected qualities of the extractable product enclosed in the chamber do not deteriorate and/or are conserved by preventing them to undergo undesirable chemical reactions with environmental chemical species. In particular, oxidizing of coffee may be prevented thereby substantially preserving its original taste, which may result in an improved quality of the beverage.

It will further be appreciated that the extractable product is not limited to coffee, as any type of solid, liquid, powdered matter may be used for preparing the beverage. For example, the capsule may comprise a concentrate, in liquid, solid or powdered form. Alternatively, or additionally, the capsule may comprise powdered milk, chocolate powder, soup powder, etc. It is also possible that the capsule comprises a suitable number of compartments accommodating a suitable number of constituents of the conceived beverage, which are intermixed upon interaction with the fluid.

It will further be appreciated that the terms 'exit area' and 'entrance area' denote respective functional regions, for example on the surface of the capsule or in its internal volume, which may be not perceivable by a bare eye. This may be possible when the capsules are shaped enabling accommodation in the receptacle in a unique way. Alternatively, the 'exit area' and/or the 'entrance area' may be suitably marked on the capsule for enabling a suitable correct positioning thereof in the system. This has a particular advantage when the capsule is shaped allowing for an orientational degree of freedom in the accommodating receptacle, for example, when the capsule has a rotational degree of freedom, for example, when the capsule is spherical, cylindrical or the like. It will be appreciated that the disposable capsule may be marketed in a package comprising a number of disposable capsules, wherein optimization of stacking in the package may lead to a desirable three-dimensional shape of the capsule which allows for orientational uncertainty in the receptacle. Particularly for such capsules identification of the 'exit area' and the 'entrance area' may be advantageous.

It will further be appreciated that the outlet arrangement may comprise a suitable collector and a conduit for guiding the beverage into the container. However, it is also possible that the outlet arrangement is integrated with the receptacle and does not have any specific collector or conduit.

It will further be appreciated that the term 'extractable product' also encompasses substances which are soluble, or are used to form suitable colloids, like instant coffee and soup-puree, for example.

In an embodiment of the system according to the invention the capsule is substantially cylindrically formed, comprising a circumferential wall, a bottom, and a lid.

It will be appreciated that the chamber does not have to be an externally accessible compartment. It is possible that, for example, that the chamber is sandwiched between further one or more functional layers of the capsule, which may, for example be cylindrically or cone-shaped.

It may be advantageous to maximize a surface area of the exit area, by shaping the disposable capsule like, for example, a pellet, or, alternatively, like a truncated cone or a pyramid. In these exemplary embodiments, the surface area of a base portion of a resulting three-dimensional object is increased improving draining of the capsule. When the disposable capsule is shaped as a pellet, a path of the fluid between the entrance area and the exit area is minimized, which may decrease a chance of occurring of preferential paths of the fluid in the capsule. When the disposable capsule is shaped as a truncated cone or a pyramid, the fluid, entering the capsule substantially from a vertex of the cone or the pyramid may have a showering effect, substantially decreasing a chance of occurring of preferential paths of the fluid in the capsule.

Additionally, a combination of the above shaping possibilities of the capsule together with the opening functionality using the displaceable body may decrease a minimum necessary pressure of the fluid sufficient for preparing the beverage. This has an effect of reducing power consumption of the system according to the invention, with respect to the system known from the art.

In a further embodiment of the system according to the invention, the exit area may be provided in or near the lid of the chamber, wherein the entrance area may be provided in or near the bottom of the chamber. Such configuration may have an advantage with regard to manufacturing ease of the capsule. For example, when the chamber has a bucket-shape, the bottom of the bucket may be used for supplying the fluid, wherein the upper portion of the bucket may be covered by a lid, wherein a lid material may have a different inherent mechanical strength than the material used for at least the walls of the bucket-shape. Such arrangement may also be advantageous, when the capsule is conceived to be laterally gripped during use.

In an embodiment of the system according to the invention, the displaceable body comprises an external actuator conceived to cooperate with an internal body, the internal body being arranged in the chamber, preferably in contact with the entrance area and/or the exit area.

It is found to be advantageous to provide a build-in arrangement, wherein an internal body is positioned in the chamber ready to be suitably displaced for providing a number of pre-determined openings in the exit area. It will be appreciated that such internal body may be substantially solid or hollow. It may, for example, comprise a terminal portion having a macroscopic cross-section. Alternatively, the internal body may comprise one or more projections having a microscopic cross-section, for example, about or less than 1 $mm^2$.

It is possible that the protrusions provided on the internal body are oriented towards the entrance area and the exit area. As a result, both the entrance and the exit area will be provided with openings upon engagement with the internal body. Preferably, the internal body is actuated by an external actuator, which may be transportable between an extended state and a depleted state. For example, the capsule may comprise an internal chamber, which may comprise exit area and/or entrance area manufactured from a material, which is mechanically weaker than overall material or materials of the capsule. Preferably, the chamber is protected from ambient environment, for example, the chamber may be sandwiched between two or more layers of a material. It will be appreciated that the layers of the material may be provided for a further functional purpose. For example, such layers of material may act as entrance- or exit filters.

It is found to be advantageous to filter the fluid and/or the beverage prior to allowing it to enter, respectively, to drain from the capsule. For example, it may be desirable to provide a beverage substantially without particles of the extractable product. By placing a suitable filter cooperating with the exit area a desired filtering effect may be achieved. It will be appreciated that a selection of a type and properties of a filter material lies within an ordinary skill of the artisan. Preferably, the filter is arranged to differentiate between coarse and fine particles of the extractable product, allowing for using multi-sized grain mixtures in the capsule, which may decrease related production costs for disposable capsules comprising such mixtures.

For example, the external actuator may be supported by deformable foil strips or the like which may be bi-stable. As a result, an accidental engagement between the external actuation device and the capsule is prevented. Additionally, due to bi-stability, the actuator is conceived to dwell in the depleted state upon interacting with the displaceable body. Such arrangement has an advantage that the actuator does not disengage the capsule leading to spilling of the product when an opened capsule is handled.

In a still further embodiment of the system according to the invention, the external actuator comprises protrusions for discontinuing the entrance area or the exit area.

It may be advantageous to provide the internal body with no protrusions or with protrusions directly only towards the entrance area. This feature is based on the insight that the chamber of the capsule might be fully fitted with a suitable product, wherein even at rest the exit area and the entrance area are conditioned under mechanical stress. In order to reduce chance of undesirable damage of the chamber during its handling, the internal body is preferably positioned nearby the exit area and the entrance area at some distance from them. It may even be possible that the internal body is positioned in contact with the exit area and the entrance area, however, the controlled opening of the exit area and the entrance area is envisaged only after the internal body is displaced by the external actuator.

The external actuator is preferably arranged for interacting with the exit area, for providing controlled openings in the capsule for drainage of the initiated beverage. When the external actuator comprises protrusions, it may be arranged to controllably discontinue a material of the exit area and in doing so to cause the internal body to be protruded further in the chamber for discontinuing the entrance area. It will be appreciated that the external actuator may be arranged either for providing openings for supplying fluid from the dispensing device towards the chamber, or for providing openings for draining the chamber. This embodiment will be discussed in more detail with reference to FIG. 2.

In a still further embodiment of the system according to the invention, the receptacle of the dispensing device is dimensioned to reject accommodating the capsule with extended external actuator.

It is found to be advantageous to provide a system wherein only capsules with pre-opened chambers are excepted thereby avoiding sharp components in the apparatus. This may be advantageous, for example, for elderly population, or for subjects with motoric abnormalities. Preferably, the external actuator is manually depressed prior to immediate use of the capsule. Such manual handling may be advantageous for providing an independent source of chamber's integrity control, as a characteristic sound may be generated upon opening the chamber for signalling that the chamber was intact. Such feature has an advantage that use of damaged capsules is avoided for preparing beverages.

In a still further embodiment of the system according to the invention, the internal body comprises a conduit provided with lateral openings for distributing the fluid in the chamber.

It is found to be advantageous to utilise the internal body as a supplementary conduit and distributor of the fluid in the chamber. As a result, creation of adverse preferential paths of the fluid in the chamber is further counteracted.

In a further embodiment of the system according to the invention the displaceable body is chemically inert with respect to the extractable product and/or fluid and/or the beverage.

It is found to be advantageous to select a material for the displaceable body to be substantially chemically inert with respect to the substance of the extractable product. It will be appreciated, that the term 'chemically inert' should be construed as inability to undergo a chemical reaction with the extractable product and/or the fluid and/or the beverage for forming a chemical product. It will be appreciated that the beverage may have different chemical properties than either the extractable product or the fluid. Particularly, the material of the displaceable body is chemically inert at elevated temperatures, for example, in the range of 90-100 C.°. This feature may be of a particular importance for public safety.

In a still further embodiment of the system according to the invention, the displaceable body is at least partially soluble in the fluid and/or the beverage. For example, the displaceable body may at least partially be formed from a taste modifier and/or a taste enhancer.

It may be advantageous to utilize the fact that the displaceable body is present in the direct vicinity of the extractable product. For example, the displaceable body may be prepared from a consumable substance, like sugar or a taste enhancer or a taste modifier. In addition, the displaceable body may be prepared from a solidified liquor concentrate, or the like. As a result, the displaceable body having discontinued the material barrier may dissolve providing a desired additional taste, flavour or other supplementary property to otherwise plane beverage. It may also be possible that the displaceable body is formed from a substance conceived to alter a pH value of the fluid, for example water. This may be particularly advantageous in areas wherein tap water has inferior properties with respect to beverage preparation there with.

Capsule according to the invention relates to a capsule of the system as is discussed in the foregoing. In particular, the capsule according to the invention comprises a displaceable body conceived to interact with the entrance area and the exit area for discontinuing the entrance area and the exit area thereby enabling the chamber to pass fluid there through. Preferably, the capsule is manufactured from a bio-degradable material.

Method of preparing a predetermined quantity of beverage suitable for consumption using extractable product in a system, according to the invention, comprises: actuating a displaceable body of the capsule for causing it to interact with the exit area and the entrance area for enabling the chamber to pass fluid there through.

Method of manufacturing a disposable capsule according to the invention, comprises: providing at least a portion of a displaceable body in the capsule for causing it in use to interact with the chamber for discontinuing the exit area and the entrance area for enabling the chamber to pass fluid there through; filling the inner space of the disposable capsule with the extractable product.

These and other aspects of the invention will be discussed in more detail with reference to drawings, wherein like reference numerals refer to like elements. It will be appreciated that the drawings are presents for illustrative purposes and may not be used for limiting the scope of the appended claims.

DESCRIPTION OF EXEMPLARY EMBODIMENTS

Figure 1A:
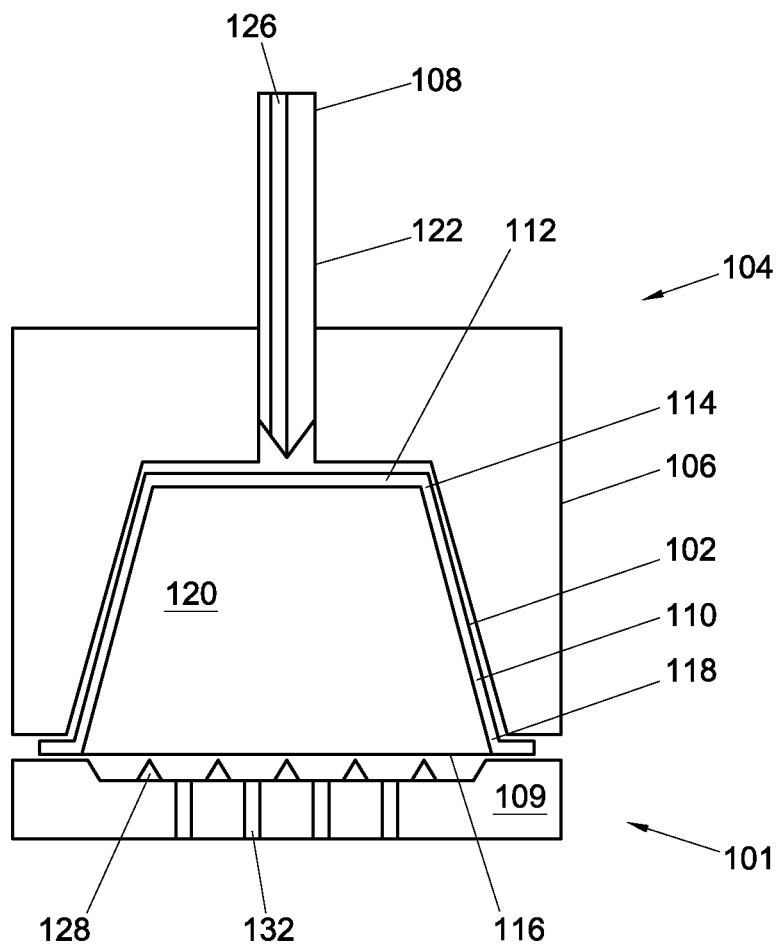
FIG. 1a-c schematically show a prior art system for preparing a beverage in cross-sectional front view.
Figure 1B:
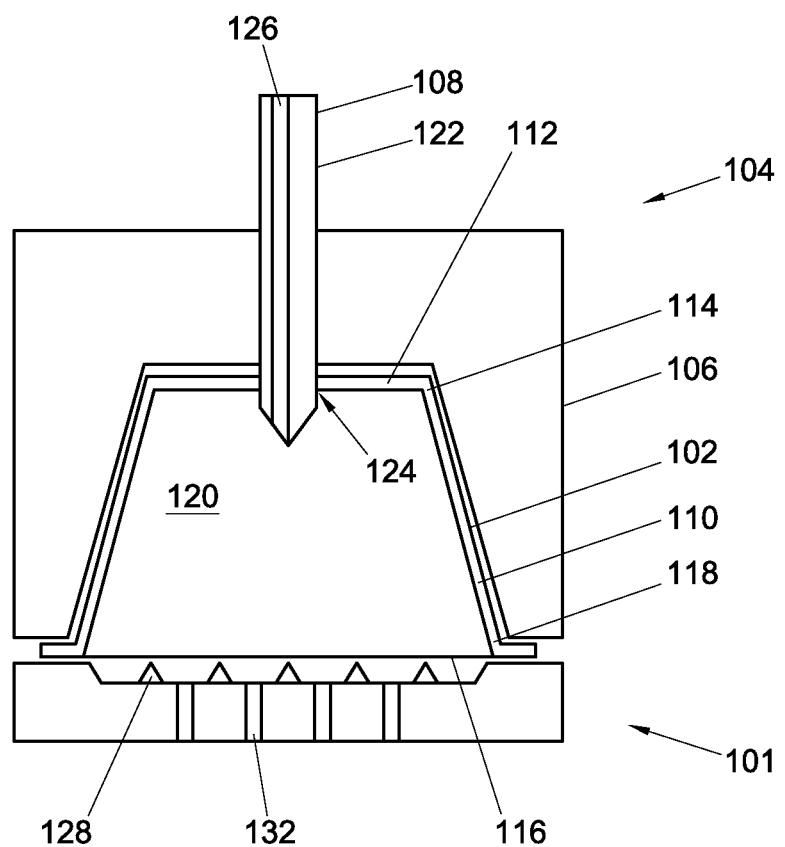
Figure 1C:
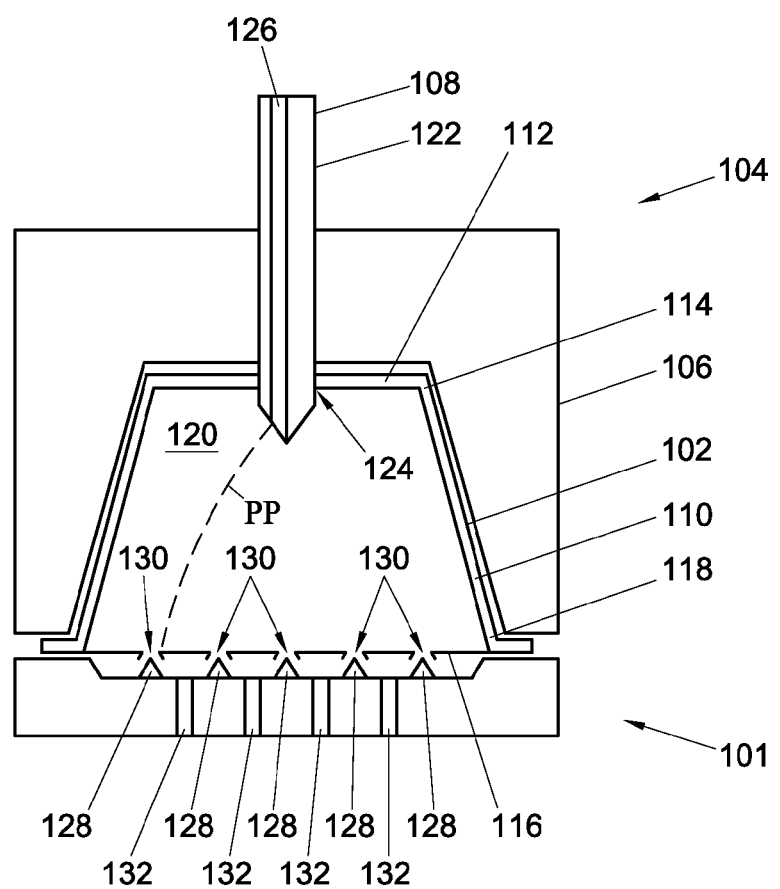

FIGS. 1a-1c show a prior art system 101 for preparing a predetermined quantity of beverage suitable for consumption using an extractable product. The system 101 comprises an exchangeable capsule 102, and an apparatus 104. The apparatus 104 comprises a receptacle 106 for holding the exchangeable capsule 102. In FIGS. 1a-1c a gap is drawn between the capsule 102 and the receptacle 106 for clarity. It will be appreciated that, in use, the capsule 102 may lie in contact with the receptacle 106. Commonly, the receptacle 106 has a shape complementary to the shape of the capsule 102. The apparatus 104 further comprises a fluid dispensing device 108 for supplying an amount of a fluid, such as water, under a pressure, of e.g. 9 bars, to the exchangeable capsule 102. Furthermore, an outlet apparatus 109 may be provided for providing fluid from the capsule 102 to a container such as a cup.

In the system 101 shown in FIGS. 1a-1c, the exchangeable capsule 102 comprises a circumferential wall 110, a bottom 112 closing the circumferential wall 110 at a first end 114, and a lid 116 closing the circumferential wall 110 at a second end 118 opposite the bottom 112. The circumferential wall 110, the bottom 112 and the lid 116 enclose an inner space 120 comprising the extractable product (not shown).

The system 101 of FIGS. 1a-1c comprises bottom piercing means 122 intended for piercing the capsule 102. FIG. 1a shows the bottom piercing means 122 in a retracted position. FIG. 1b shows the bottom piercing means 122 in an extended position for creating an entrance opening 124 in the bottom 112 for supplying the fluid to the extractable product 20 through the entrance opening 124. In FIGS. 1a-1c the piercing means 122 comprise a bore 126 through which the fluid can be supplied to the extractable product 20 contained in the inner space 120. The system 101 of FIGS. 1a-1c further comprises lid piercing means 128, here embodied as protrusions, intended for piercing the lid 116 of the capsule 102. In the shown embodiment, the lid piercing means 128 may form part of the outlet arrangement 109.

The system 101 shown in FIGS. 1a-1c is operated as follows for preparing a cup of coffee, wherein the extractable product is roasted and ground coffee.

The capsule 102 is placed in the receptacle 106 (see FIG. 1a). The bottom piercing means are activated to pierce the bottom 112 of the capsule 102 (see FIG. 1b) for creating the entrance opening 124. The fluid, here hot water under pressure, is supplied to the extractable product in the inner space 120 through the entrance opening 124. The water will wet the coffee grounds and extract the desired substances to form the coffee beverage.

During supplying the water under pressure to the inner space 120, the pressure inside the capsule 102 will rise. The rise in pressure will cause the lid 116 to deform and be pressed against the lid piercing means 128. Once the pressure reaches a certain level, the tear strength of the lid 116 will be surpassed and the lid will rupture against the lid piercing means 128, creating exit openings 130 (see FIG. 1c). The prepared coffee will drain from the capsule 102 through the exit openings 130 and outlets 132 of the outlet arrangement 109, and may be supplied to a container such as a cup (not shown).

During preparation of the beverage in the system 101 shown in FIGS. 1a-1c preferential flow paths may exist in the extractable product inside the inner space 120 of the capsule 102. These preferential paths may extend from the entrance opening 124 to the exit openings 130. One such possible preferential path is indicated with line PP in FIG. 1c.

Figure 2:
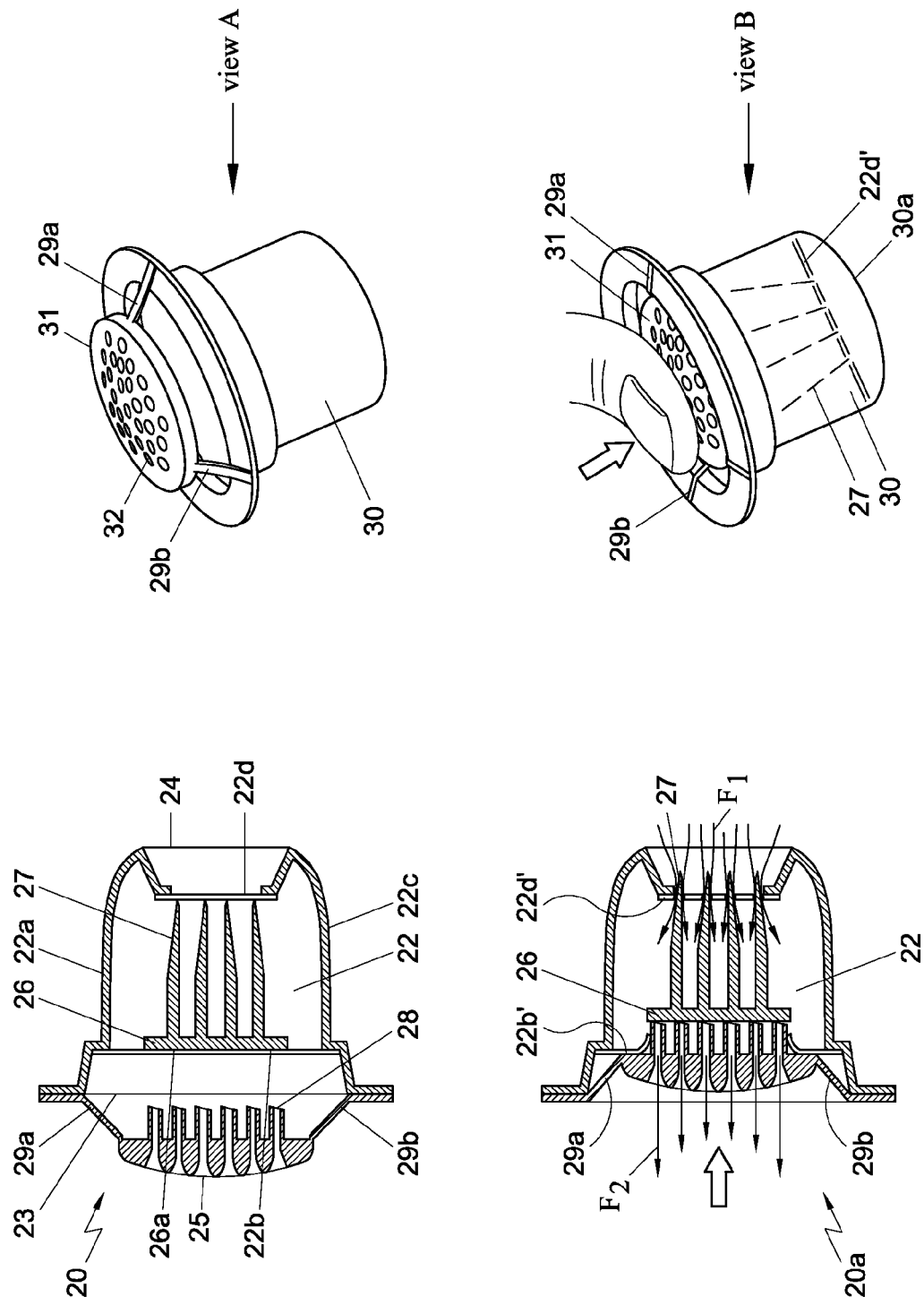
FIG. 2 presents in a schematic way an embodiment of a disposable capsule according to an aspect of the invention.

FIG. 2 presents in a schematic way an embodiment of a disposable capsule according to an aspect of the invention. View A presents schematically a cross-section of the disposable capsule 20 and a corresponding isometric view thereof, whereby view B presents schematically a cross-section and a corresponding isometric view of the capsule 20a immediately before use.

Referring to view A, the disposable capsule 20 comprises a chamber 22 conceived to accommodate a suitable product (not shown) for preparing a beverage. The chamber 22 is bounded by structures 22a, 22b, 22c and 22d, some of which may relate to external surfaces of the capsule, while the other may relate to internal surfaces of the capsule. For example, boundaries 22a, 22c may relate to an outer wall of the capsule, whereas boundaries 22b, 22d may relate to supplementary foils, membranes, tissues or the like. For example, structures 22b, 22d may relate to an exit and an entrance filter, respectively. The capsule may comprise further outer structures 24, 23 which may relate to suitable protective layers, which may be implemented from a more rigid and mechanically stronger material, than material used for items 22b, 22d.

In accordance with the invention, the chamber is provided with a displaceable body 25, 26 conceived to provide entrance and exit openings in a controlled way. The displaceable body according to an aspect of the invention comprises two cooperating parts—an external actuator 25 and an internal body 26, the latter being accommodated in the chamber 22. Preferably, the internal body is dimensioned to substantially match a dimension of the chamber in a direction of a fluid flow.

According to the invention different modes of providing entrance and exit openings are envisaged. First, the internal body 26 may be constructed as an object having a substantial outer cross-section, see terminal area 26a of the internal body 26. The terminal area 26a may be substantially flat. This may be advantageous for preventing accidental damage of the chamber 22 during mere handling of the capsule, which is not linked to a purposeful discontinuation of the layer 22b. When a portion of the internal body 26a is flat and covers a substantial area, that is an area comparable with a surface area of the exit area, for example, the external actuator 25 may be formed with projections 28 which are conceived to cooperate with the area 26a for piercing the exit area 22b. The terminal portion 26a acts in this case as a support structure for the actuator 25 for enabling controlled piercing.

Secondly, the terminal portion 26a of the internal body may comprise projections 27. It will be appreciated that projections may be provided as isolated items running for a substantial distance from a base 26a. Alternatively, the projections may be microscopic protrusions from a massive base, see FIG. 3. When the internal body 26 is being pushed by the external actuator 25, it is displaced towards the entrance area 22d discontinuing it in a controlled manner.

Thirdly, it is possible that the internal body 26 comprises projections or protrusions at its both outer surfaces facing the exit area 22b and the entrance area 22d. In this case, the external actuator 25 may be provided with protrusions, or may be substantially flat, as a controlled discontinuation of the exit area 22b is realized by the protrusions of the internal body. Should the external actuator 25 be provided with protrusions 28, the protrusions 28 are preferably displaced relative to counterpart protrusions of the internal body 26.

It may be advantageous to shape the internal body 26 flat at one of its terminal areas. For example, the internal body 26 may rest by its flat terminal area on the exit area 22b upon storage. Provided the internal body is a light weight member and provided the surface area of the internal body is substantially large, such arrangement may represent a safe 'parking' arrangement having a minimum risk of accidental chamber damage during storage.

View B depicts in a schematic way a cross-section of a disposable capsule 20a upon an event the external actuator has been pressed against the internal body 26. As a result, protrusions of the internal body 27 discontinue the entrance area 22d', the exit area 22b' being discontinued by protrusions of the external actuator.

It may be preferable that the external actuator is movably attached to the capsule, wherein an attaching member, for example bridges 29a, 29b are implemented as a bi-stable structure, having a first stable position for an extended state (shown in view A) and a second stable position for a depleted state (see view B). As a result the chamber 22 is capable of letting a suitable fluidum through its internal volume, as is schematically shown by F1, F2. It will be appreciated that the term fluidum may relate to at least the fluid used to prepare the beverage as well as the beverage.

It will be appreciated that the internal body 26 may be dimensioned to discontinue only a wall of the internal chamber, as is schematically shown in the right portion of view B. This may be advantageous, when it is desirable that one or more structures post exit area stay intact. For example, an outer surface of the capsule 30 may be formed as a filter area 30a, which should not be disrupted or otherwise deformed upon opening the chamber. In case when the filter 30a corresponds to an outer surface of the capsule, the filter area may be protected by a peel-off foil (not shown).

It will further be appreciated that the external actuator 31 may be provided with a suitable number of openings 32 for allowing a fluid inflow or a beverage outflow from the chamber. In case when the chamber is conceived to be filled with a fluid under pressure, it may be preferable to arrange a receptacle of the apparatus of the system according to the invention to maintain the capsule with the depleted actuator. For example, the receptacle may be shaped for substantially tightly fitting the capsule provided with a depleted actuator.

Figure 3:
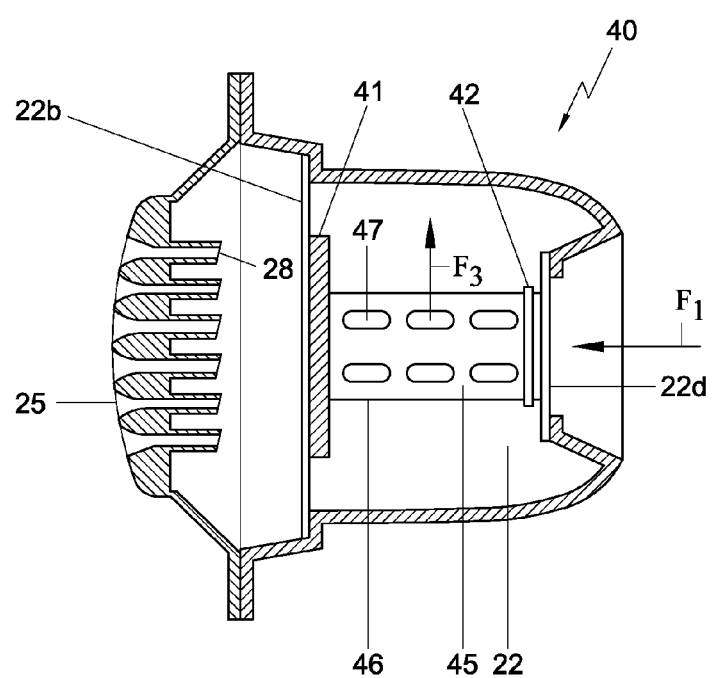
FIG. 3 presents in a schematic way the disposable capsule of FIG. 2 accommodated in a receptacle of the system according to the invention.

FIG. 3 presents in a schematic way the disposable capsule of FIG. 2 accommodated in a receptacle of the system according to the invention. The disposable capsule 40 may comprise similar items as discussed with reference to FIG. 2. However, in this exemplary embodiment, the internal body 46, arranged in the chamber 22, is provided with a conduit 45 having lateral openings 47. The fluid stream F1 entering the capsule 40 may be distributed in the inner space of the chamber 22 by means of radial flows F3 emerging from the body 46. According to this feature creation of preferential paths in the inner space is counteracted.

The internal body 46 may comprise flat terminal portions 41, 42, in which case creation of a macroscopic entrance openings may be enabled. Alternatively one or both terminal portions 41, 42 may be provided with suitable projections for provided a desired network of openings.

It will be appreciated that while specific embodiments of the invention have been described above, that the invention may be practiced otherwise than as described. In addition, isolated features discussed with reference to different figures may be combined.

What is claimed is:

1. A combination fluid dispensing device and disposable capsule for preparing a predetermined quantity of beverage suitable for consumption using an extractable product comprising:
   at least one disposable capsule;
   an apparatus comprising a fluid dispensing device for supplying an amount of fluid to the at least one disposable capsule, a receptacle for accommodating the at least one disposable capsule, and an outlet arrangement for supplying the beverage to a container;
   wherein the at least one disposable capsule comprises a chamber enclosing an inner space comprising the extractable product, wherein the chamber comprises:
   an entrance area enabling passage of the fluid towards the inner space for interacting with the extractable product for preparing the beverage;
   an exit area for conducting at least a portion of the beverage away from the capsule;
   wherein the combination fluid dispensing device and disposable capsule is further arranged for:
   bringing the dispensing device in fluid communication with the entrance area for supplying the fluid;
   enabling the exit area to be positioned in a fluid communication with the outlet arrangement; and
   wherein the capsule further comprises an internal displaceable body arranged in the chamber in contact with the entrance area and/or the exit area and an external actuator to cooperate with said internal displaceable body to interact with the entrance area and the exit area for discontinuing the entrance area and the exit area thereby providing controlled openings in the capsule for drainage of the beverage.

2. The combination fluid dispensing device and disposable capsule of claim 1, wherein the disposable capsule is substantially cylindrically formed, comprising a circumferential wall, a bottom, and a lid.

3. The combination fluid dispensing device and disposable capsule of claim 2, wherein the exit area is provided in or near the lid of the disposable capsule.

4. The combination fluid dispensing device and disposable capsule of claim 2, wherein the entrance area is provided in or near the bottom of the disposable capsule.

5. The combination fluid dispensing device and disposable capsule of claim 1, wherein the internal body comprises protrusions.

6. The combination fluid dispensing device and disposable capsule of claim 5, wherein the protrusions are oriented towards the entrance area and the exit area.

7. The combination fluid dispensing device and disposable capsule of claim 1, wherein the external actuator is transportable between an extended state and a depleted state.

8. The combination fluid dispensing device and disposable capsule of claim 7, wherein the external actuator remains in the depleted state upon interacting with the displaceable body.

9. The combination fluid dispensing device and disposable capsule of claim 8, wherein the external actuator is linked to a body of the capsule by a flexible bridge.

10. The combination fluid dispensing device and disposable capsule of claim 9, wherein a material of the flexible bridge is bi-stable, having a first stable state for an extended position of the external actuator and a second stable state for a depleted position of the external actuator.

11. The combination fluid dispensing device and disposable capsule of claim 1, wherein the external actuator comprises protrusions for discontinuing the entrance area or the exit area.

12. The combination fluid dispensing device and disposable capsule of claim 1, wherein the external actuator is provided with openings for supplying fluid towards the chamber or for draining the chamber.

13. The combination fluid dispensing device and disposable capsule of claim 7, wherein the receptacle is dimensioned to reject accommodating the capsule with an extended actuator.

14. The combination fluid dispensing device and disposable capsule of claim 1, wherein the internal body comprises a conduit provided with lateral openings for distributing the fluid in the chamber.

15. The combination fluid dispensing device and disposable capsule of claim 1, wherein the internal body, is chemically inert with respect to the extractable product and/or the fluid, and/or the beverage.

16. The combination fluid dispensing device and disposable capsule of claim 1, wherein the internal body is at least partially soluble in the fluid and/or the beverage.

17. The combination fluid dispensing device and disposable capsule of claim 16, wherein at least a portion of the internal body is formed from a taste modifier and/or a taste enhancer.

18. The combination fluid dispensing device and disposable capsule of claim 1, wherein the chamber is sandwiched between one or more layers of material.

19. The combination fluid dispensing device and disposable capsule of claim 18, wherein at least one layer of material comprises a filter.

20. The combination fluid dispensing device and disposable capsule of claim 1, wherein the exit area and/or the entrance area are manufactured from a mechanically weak material.

21. The combination fluid dispensing device and disposable capsule of claim 1, wherein the capsule is manufactured from a bio-degradable material.

22. A method of preparing a predetermined quantity of beverage suitable for consumption using an extractable product in the combination fluid dispensing device and disposable capsule of claim 1, the method comprising:

providing at least one disposable capsule; providing an apparatus comprising a fluid dispensing device for supplying an amount of fluid to the at least one disposable capsule, a receptacle for accommodating the at least one disposable capsule, and an outlet arrangement for supplying the beverage to a container;

manually actuating a displaceable body of the capsule causing it to interact with the exit area and the entrance area enabling the chamber to pass fluid there through;

bringing the dispensing device in fluid communication with the entrance area of the capsule and the exit area of the capsule in a fluid communication with the outlet arrangement; and dispensing the fluid into the entrance of said capsule to extract the beverage into the receptacle.

* * * * *